(12) United States Patent
Mirza et al.

(10) Patent No.: US 11,930,425 B2
(45) Date of Patent: *Mar. 12, 2024

(54) SESSION RECOVERY FROM DEDICATED BEARER FAILURE

(71) Applicant: T-Mobile USA, Inc., Bellevue, WA (US)

(72) Inventors: Khurram Ahmad Mirza, Bellevue, WA (US); Mohammed Al-Mehdar, Bellevue, WA (US); Anas Said M. Jabeiti, Kirkland, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,816

(22) Filed: Oct. 17, 2022

(65) Prior Publication Data

US 2023/0043429 A1 Feb. 9, 2023

Related U.S. Application Data

(63) Continuation of application No. 17/302,636, filed on May 7, 2021, now Pat. No. 11,483,684.

(51) Int. Cl.
*H04W 4/12* (2009.01)
*H04L 65/1016* (2022.01)
(Continued)

(52) U.S. Cl.
CPC ........... *H04W 4/12* (2013.01); *H04L 65/1016* (2013.01); *H04L 65/1069* (2013.01);
(Continued)

(58) Field of Classification Search
CPC ......... H04W 4/12; H04W 76/11; H04W 8/26; H04L 65/1104; H04L 65/1016;
(Continued)

(56) References Cited

U.S. PATENT DOCUMENTS

2006/0291404 A1* 12/2006 Thubert .................. H04L 45/00
370/254
2006/0294244 A1 12/2006 Naqvi et al.
(Continued)

FOREIGN PATENT DOCUMENTS

WO WO2011099523 8/2011

*Primary Examiner* — Mewale A Ambaye
(74) *Attorney, Agent, or Firm* — Lee & Hayes P.C.

(57) ABSTRACT

Techniques and systems for recovering a communication session from a dedicated bearer failure are disclosed. For example, a P-CSCF node can determine that a dedicated bearer associated with a communication session has failed, and, in response, send a SIP message to a UE associated with the communication session, the SIP message causing the UE to refrain from sending SIP requests using a SIP INVITE method. The process may further include identifying a first network node associated with an identifier of the UE, the first network node comprising one of a PGW or a SMF, and sending an instruction to the first network node to dissociate the dedicated bearer from the communication session. This causes a new attach procedure to be performed by the UE to recover the session without session failure.

20 Claims, 5 Drawing Sheets

(51) Int. Cl.
*H04L 65/1069* (2022.01)
*H04L 65/1073* (2022.01)
*H04L 65/1104* (2022.01)
*H04M 15/00* (2006.01)
*H04W 76/11* (2018.01)

(52) U.S. Cl.
CPC ...... *H04L 65/1073* (2013.01); *H04L 65/1104* (2022.05); *H04M 15/66* (2013.01); *H04W 76/11* (2018.02)

(58) Field of Classification Search
CPC . H04L 65/1069; H04L 65/1073; H04L 61/00; H04L 12/1818; H04L 67/104; H04L 67/14; H04M 15/66
See application file for complete search history.

(56) References Cited

U.S. PATENT DOCUMENTS

| | | | | |
|---|---|---|---|---|
| 2007/0091811 | A1* | 4/2007 | Thubert | H04L 45/20 370/252 |
| 2009/0285124 | A1* | 11/2009 | Aguirre | H04W 40/24 370/255 |
| 2014/0094210 | A1* | 4/2014 | Gellens | H04W 4/12 455/517 |
| 2016/0029228 | A1 | 1/2016 | Mufti | |
| 2017/0156043 | A1 | 6/2017 | Li et al. | |
| 2017/0238359 | A1 | 8/2017 | Atarius et al. | |
| 2019/0313319 | A1* | 10/2019 | Qiao | H04M 15/57 |
| 2019/0335534 | A1* | 10/2019 | Atarius | H04L 65/1016 |
| 2019/0394814 | A1* | 12/2019 | Bakker | H04L 65/1104 |
| 2020/0170064 | A1* | 5/2020 | Keller | H04L 69/40 |
| 2020/0204676 | A1* | 6/2020 | Chiang | H04M 3/2227 |

* cited by examiner

SESSION RECOVERY FROM DEDICATED BEARER FAILURE

RELATED APPLICATIONS

This application is a continuation of and claims priority to U.S. patent application Ser. No. 17/302,636, filed May 7, 2021, titled "SESSION RECOVERY FROM DEDICATED BEARER FAILURE," the entirety of which is incorporated herein by reference.

BACKGROUND

When a user dials a phone number on a user equipment (UE) to make a call, a dedicated bearer is established for the UE to provide a dedicated tunnel and a guaranteed bit rate (GBR) for the transmission of network traffic. Although today's telecommunications networks are fairly reliable, it is possible for the dedicated bearer to fail. This can be due to various issues that arise from time-to-time, such as data corruption in a routing table, a sudden unavailability of a Diameter routing agent (DRA), or the like. In existing telecommunications networks, when a dedicated bearer fails, the call may be dropped. At best, the UE may be able to fall back to using a circuit-switched (CS) network to establish the call on a legacy CS network (e.g., a $2^{nd}$ Generation (2G) or $3^{rd}$ Generation (3G) network). Either way, a user's experience is negatively impacted because the user is either forced to utilize a suboptimal legacy network, or otherwise re-dial the number manually. The disclosure made herein is presented with respect to these and other considerations.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
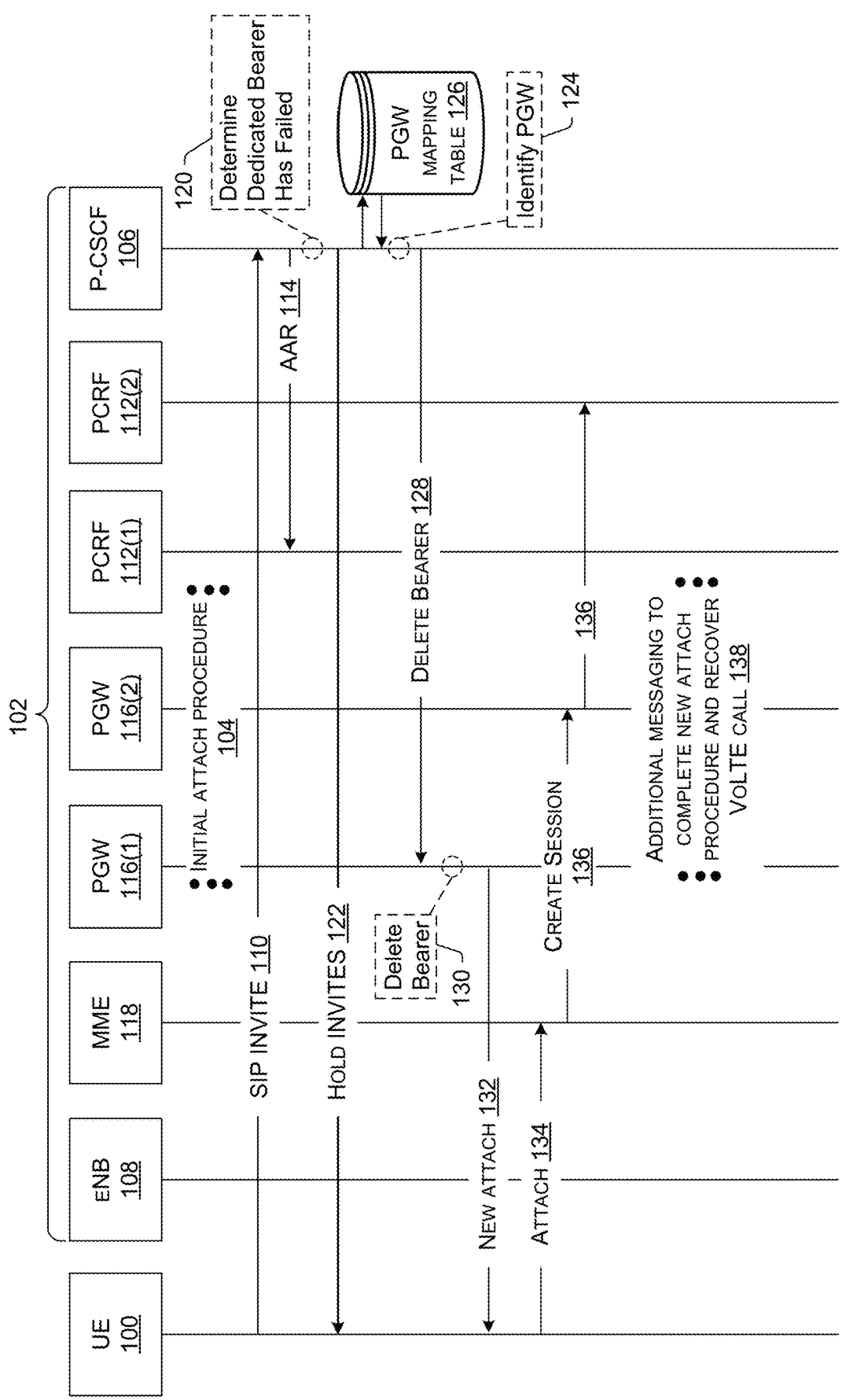
FIG. 1 is a diagram illustrating example signaling between a UE and example network nodes of a $4^{th}$ Generation (4G) Long Term Evolution (LTE) network during setup of a Voice over LTE (VoLTE) call, as well as a technique for recovering the VoLTE call from a dedicated bearer failure.

Described herein are techniques and systems for preventing failure of a communication session in the event that a dedicated bearer fails. The techniques and systems described herein allow for recovering a communication session when it has become apparent that the dedicated bearer has failed, such as during setup of the communication session. Although examples are described herein with respect to components of 4G LTE and 5G NR networks, it is to be appreciated that the techniques and systems described herein are not limited to 4G and 5G implementations, and are applicable to any existing or future Internet Protocol (IP)-based network technology or evolution of an existing IP-based network technology. For example, the techniques and systems described herein are also applicable to Internet of things (IoT) devices and systems.

In an illustrative example, when a user dials or selects phone number on a UE (e.g., a mobile phone) to make a call, a dedicated bearer is established for the UE to provide a dedicated tunnel and a GBR for the transmission of network traffic during the communication session. During the setup of the communication session, a proxy call session control function (P-CSCF) node is configured to determine whether the dedicated bearer associated with the communication session has failed. The P-CSCF node can make this determination in various ways by attempting to communicate with a policy and charging rules function (PCRF) or a policy control function (PCF), depending on whether a 4G or a 5G network is being utilized. In response to determining that the dedicated bearer has failed, the P-CSCF node is configured to initiate a session recovery process for recovering the communication session so that a session failure is prevented. That is, the session recovery process described herein is aimed at avoiding a dropped call scenario or triggering a CS fallback procedure.

In the session recover process, the P-CSCF node may initially send a Session Initiation Protocol (SIP) message to the UE upon determining that a dedicated bearer associated with the communication session has failed. This SIP message causes the UE to refrain from sending SIP requests using a SIP INVITE method until the UE receives further instructions. After sending this SIP message to the UE, the P-CSCF node is configured to identify a first network node associated with an identifier of the UE, wherein the first network node is a packet data network gateway (PGW) or a session management function (SMF), depending on whether a 4G or a 5G network is being utilized. In some instances, the P-CSCF node uses a lookup table to determine that the first network node is associated with the identifier of the UE, such as a lookup table that associates UE identifiers with assigned PGWs (for 4G) or assigned SMFs (for 5G). Upon identifying the first network node, the P-CSCF node is configured to send an instruction to the first network node to dissociate the dedicated bearer from the communication session. In some examples, the P-CSCF node is configured to use a representational state transfer (REST) application programming interface (API) to send this instruction to the first network node. This instruction causes the first network node to send a message to the UE to cause the UE to perform a new attach procedure to recover the communication session. That is, after the UE receives a SIP response from the P-CSCF node causing the UE to refrain from sending SIP requests using the SIP INVITE method, and in response to the UE subsequently receiving the message from the first network node (e.g., the PGW or the SMF) to perform a new attach procedure to recover the communication session, the UE may send, to the P-CSCF node (or a different P-CSCF node), a new SIP request using a SIP REGISTER method, followed by a new SIP request using the SIP INVITE method, thereby recovering the communication session without session failure. That is, when the P-CSCF node (or the different P-CSCF node) receives the new SIP request using the SIP INVITE method, the session is restored by establishing a new dedicated bearer (e.g., with a newly-assigned PCRF/PCF, and a newly-assigned PGW/SMF), and the session is recovered using the preferred or otherwise available telecommunications network (e.g., a 4G network or a 5G network).

The techniques and system described herein improve network reliability, and, hence, the call experience for a user of a telecommunication network, as compared to existing networks that result in a session failure when there is a dedicated bearer failure. This improvement is, at least in part, due to recovering a communication session so that it does not fail, which means that the user does not experience a dropped call or limited coverage and/or bandwidth using a legacy CS network (e.g., a 2G/3G network). In other words, from the user's perspective, nothing seems to be amiss because the session recovery process is carried out "behind-the-scenes" and a call is established notwithstanding a dedicated bearer failure. The techniques, devices, and systems described herein may further allow one or more devices to conserve resources with respect to processing resources, memory resources, networking resources, power resources, etc., in the various ways described herein. For example, by recovering communication sessions before they fail, a UE and/or a base station and/or another network node(s) may conserve processing resources, power resources (e.g., battery power), and the like by avoiding frequent retries to re-establish a communication session, such as after a dropped call.

An example process to be implemented by a network node(s), such as a P-CSCF node, can include determining that a dedicated bearer associated with a communication session has failed, and sending a SIP message to a UE associated with the communication session, the SIP message causing the UE to refrain from sending SIP requests using a SIP INVITE method. The process may further include identifying a first network node associated with an identifier of the UE, the first network node comprising one of a PGW or a SMF, and sending an instruction to the first network node to dissociate the dedicated bearer from the communication session.

An example process to be implemented by a UE can include sending to a first P-CSCF node, a first SIP request using a SIP INVITE method to setup a communication session, and receiving a SIP response from the first P-CSCF node. In response to the receiving of the SIP response, the UE may refrain from sending SIP requests using the SIP INVITE method. The process may further include receiving a message to perform a new attach procedure to recover the communication session. In response to the receiving of the message, the UE may send, to the first P-CSCF node or a second P-CSCF node, a second SIP request using a SIP REGISTER method, as well as a third SIP request using the SIP INVITE method to recover the communication session.

Also disclosed herein are systems and devices comprising one or more processors and one or more memories, as well as non-transitory computer-readable media storing computer-executable instructions that, when executed, by one or more processors perform various acts and/or processes disclosed herein.

FIG. 1 is a diagram illustrating example signaling between a UE 100 and example network nodes 102 of a 4G LTE network during setup of a VoLTE call, as well as a technique for recovering the VoLTE call from a dedicated bearer failure. It is to be appreciated that the "nodes" 102 depicted in FIG. 1 may in fact represent multiple nodes or a single node. It is also to be appreciated that additional nodes may be utilized in the setup of a communication session (e.g., a VoLTE call) even though they are not depicted in FIG. 1. For example, and without limitation, one or more serving CSCF (S-CSCF) nodes, application servers, a home subscriber server (HSS), and the like may be involved in the setup of a communication session, as would be recognized by a person having ordinary skill in the art.

In accordance with various embodiments described herein, the terms "user equipment (UE)," "wireless communication device," "wireless device," "communication device," "mobile device," "client device," and "device" may be used interchangeably herein to describe any UE (e.g., the UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), LTE, Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including 5G NR network protocols, and/or existing or legacy network technology, such as 2G, 3G, 4G, including circuit-switched networking protocols and/or packet-switched networking protocols. The UE 100 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like.

In general, a user can utilize the UE 100 to communicate with other computing devices of a telecommunications network via an Internet Protocol Multimedia Subsystem (IMS) core. An IMS core is sometimes referred to herein as "IMS core network," "IMS network," "Core Network (CN)," or "IM CN Subsystem". The IMS core is an architectural framework defined by the $3^{rd}$ generation partnership project (3GPP) for delivering Internet Protocol (IP) multimedia to a UE, such as the UE 100. The IMS core can be maintained and/or operated by one or more service providers, such as one or more wireless carriers (or "operators"), that provide IMS-based services to users (sometimes called "subscribers") who are associated with UEs, such as the UE 100. For example, a service provider may offer multimedia telephony services that allow a subscribed user to call or message other users via an IMS core using his/her UE. A user can also utilize an associated UE to receive, provide, or otherwise interact with various different IMS-based services by accessing computing devices of an IMS core. In this manner, an operator of an IMS core may offer any type of IMS-based service, such as, telephony services, emergency services (e.g., E911), gaming services, instant messaging services, presence services, video conferencing services, social networking and sharing services, location-based services, push-to-talk services, real-time text (RTT) services, and so on. In order to access these services (e.g., telephony services), a UE is configured to request establishment of a communication session. In the case of telephony services, the communication session may comprise a call (e.g., a VoLTE call in the example of FIG. 1, or a VoNR call in the example of FIG. 2).

The UE 100 is configured to utilize various access networks, including radio access networks (RANs) and/or radio access technologies (RATs), in order to access certain ones of the network nodes 102, including those that are part of the IMS core. UEs that are 5G NR-compliant may be configured to communicate with heterogeneous cellular networks by employing radios that can communicate over 5G systems (or "5G networks") as well as over legacy or predecessor systems (or "legacy networks") relative to 5G systems. Similarly, UEs that are 4G LTE-compliant may be configured to communicate within heterogeneous cellular networks by employing radios that can communicate over LTE systems (or "LTE networks") as well as over legacy or predecessor systems (or "legacy networks") relative to 4G systems. Today's legacy networks, such as third generation (3G), and second generation (2G) networks, may employ circuit-switching for voice communications, while 5G and 4G LTE networks employ packet-switching for both data and voice communications in an all-IP data transport technology. In general, 4G LTE-compliant UEs and 5G NR-compliant UEs are configured to prefer attachment to corresponding networks, which offer relatively high data-rate throughput as compared to available legacy or predecessor networks. In most UEs, a choice of which protocol to employ depends primarily on what networks are available to the UE at the UE's present geographic location. Furthermore, in instances where the preferred network (e.g., 4G, 5G, etc.) is unavailable or unusable for any reason, legacy networks, if available, may be used as a fallback protocol, such as by using a circuit-switch fallback (CSFB) mechanism. The UE 100 of FIG. 1 can comprise a UE with such capabilities to allow for communication over any type of telecommunications network.

FIG. 1 illustrates that the UE 100 may perform an initial (first) attach procedure 104 in order to attach to a telecommunications network. In instances where a legacy network is available to the UE 100, the UE 100 can utilize a "combined attach" procedure where the UE 100 sends an attachment request by performing registration for services via both a legacy (e.g., circuit-switched) network and a preferred (e.g., packet-switched) network, such as 4G LTE. If successful in the combined attached registration procedure, the result of the attachment request is one where the UE 100 is "combined attached," and the UE 100 can thereafter implement fallback procedures to reattempt establishment of a communication session via a legacy network in the event that a communication session (e.g., a VoLTE call) fails, on a preferred network or cannot be provided with sufficient Quality of Service (QoS) (i.e., below a QoS threshold) on the preferred network. If unsuccessful in the combined attach request, or if there is only a single network available (e.g., the UE is at a geographic location within a 4G LTE-only coverage area), a different result of the attachment request may be one where the UE 100 is not combined attached, and is therefore attached to a single network, such as a 4G LTE network. In either case, an attached UE that has completed the initial attach procedure 104 will have established a radio link in order to transmit data to, and receive data from, particular ones of the nodes 102 in the telecommunications network, including one or more nodes in the IMS core.

The initial attach procedure 104 may include, among other sub-procedures, requesting registration for one or more IMS-based services provided via the IMS core. Registration of the UE 100 can involve identifying a P-CSCF node 106 of the IMS core, and sending a registration request via a RAN (e.g., via a Evolved Node B 108 (abbreviated to "eNB" 108 in FIG. 1)) to an address of the P-CSCF node 106. To register for VoLTE services, the registration request may include an packet data network (PDN) connectivity request.

As used herein, a "request" is a message that is sent from a UE, such as the UE 100, to a network node 102. Meanwhile, a "response" is a message that is sent from a network node 102 to a UE, such as the UE 100. This construct may be used when discussing communications that use any particular signaling protocol, SIP being one example protocol. For example, SIP may be used by the UE 100 for transmitting messages to/from a network node 102. Accordingly, a "SIP request" is a message that is sent from a UE, such as the UE 100, to a network node 102 using SIP protocol, and a "SIP response" is a message that is sent from a network node 102 to a UE, such as the UE 100, using SIP protocol. SIP is a signaling protocol that can be used to establish, modify, and terminate multimedia sessions (e.g., a multimedia telephony call, an emergency call, etc.) over packet networks, and to authenticate access to IMS-based services. Accordingly, during the initial attach procedure 104, the UE 100 may send a SIP request (e.g., a registration request) using the SIP REGISTER method as part of the initial procedures for establishing a multimedia communication session.

After the UE 100 has performed the initial attached procedure 104 and is attached to a telecommunications network, a user of the UE 100 can initiate a communication session, such as a VoLTE call. To accomplish this, the user can dial a number in any suitable fashion, such as by selecting an existing contact (e.g., a stored phone number), by dialing a phone number on a keypad (e.g., a soft keypad presented on a touch screen, or a physical keypad of the UE 100 having depressible buttons, etc.), by speaking an utterance (e.g., "Call Mom") that is detected by a microphone of the UE 100 and understood by voice recognition software, and so on.

To initiate a VoLTE call, the UE 100 may send a SIP request 110 using the SIP INVITE method. This SIP request 110 may be sent from the UE 100 (acting as a mobile originating (MO) UE) to the IMS core, and in particular, to a P-CSCF node 106. The P-CSCF node 106 acts as the ingress and egress point to and from the IMS core with respect to the UE 100. The responsibilities of the P-CSCF node 106 may include, without limitation, onward routing of registration and session requests to the correct nodes 102 in the network, ensuring a S-CSCF node is kept updated on the RAN the UE 100 is using, providing session information to a policy and charging rules function (PCRF) 112(1), and maintaining a secure connection with the UE 100. The SIP request 110 represents a communication session request for a communication session that is to be established with a terminating UE, and it is the initial (or first) SIP request 110, which starts a SIP dialogue. It is to be appreciated that, although many of the examples herein are described in the context of an originating UE 100 during the setup of a communication session, the techniques and systems described herein are not limited to session setup or to an originating UE for that matter, as the techniques and systems are also applicable to a terminating UE and/or to mid-session scenarios, such as adding a party in the middle of an ongoing session (e.g., a conference call), upgrading or downgrading a VoLTE call during an already-established session, resuming a call that has been placed on-hold, or the like. These alternate example scenarios in which the techniques and systems may be implemented may still involve sending the SIP request 110 (e.g., the SIP INVITE) from a UE 100 (e.g., MO, or mobile terminating (MT)) to the IMS core (e.g., to a P-CSCF node 106).

It is to be appreciated that the initial setup procedures for a VoLTE call can include various actions and message transmissions by and between the UE 100 and various network nodes 102 in addition to the example actions and message transmission described herein and shown in FIG. 1. In general, any suitable setup procedures known to a person having ordinary still in the art can be included in the initial setup procedures to establish a communication session for the UE 100 over a telecommunications network. Because network topologies vary between service providing entities, the signaling employed during attach procedures and setup procedures may vary. FIG. 1 illustrates an example setup procedure that involves the P-CSCF node 106 sending an authorization authentication request (AAR) 114 to the PCRF 112(1). The AAR 114 may be sent in response to the P-CSCF node 106 receiving the SIP INVITE 110. The P-CSCF node 106 may extract information, such as QoS information, based on an interaction with a telephony application server (TAS) (not shown in FIG. 1), and may include the extracted information in the AAR 114 that is sent to the PCRF 112(1). Accordingly, the AAR 114 may include a media component description containing information such as the Max-Requested-Bandwidth-UL (uplink), the Max-Requested-Bandwidth-DL (downlink), and other information describing the traffic flows being requested. For instance, a VoLTE call may request a Rel-time Transport Protocol (RTP) flow or a RTP Control Protocol (RTCP) flow. RTP is a standardized packet format for delivering audio and video over IP networks. RTCP may be used to monitor transmission statistics and QoS, and may aid in the synchronization of multiple streams.

In general, the PCRF 112(1) creates and installs a set of charging and QoS rules for the media information received in the AAR 114. The PCRF 112(1) is configured to answer the AAR 114 by transmitting an authorization authentication answer (AAA) to the P-CSCF node 106, and the PCRF 112(1) is also configured to cause a dedicated bearer to be established for the communication session. For example, although not shown in FIG. 1, the PCRF 112(1) is generally configured to transmit a Re-Authenticate-Request (RAR) to a packet data network gateway (PGW) 116(1), which may cause the installation of the charging rules created by the PCRF 112(1), such as GBR bandwidth reserved for the VoLTE call (e.g., in bits per second (bps)) for the RTP stream (both UL and DL directions), as well as a QoS Class Indicator (QCI) value. Additionally, a policy and charging enforcement function (PCEF) (not shown in FIG. 1), may perform QoS and charging rules analysis using the set of charging and QoS rules received from the PCRF 112(1) in the RAR. The charging rules analysis may trigger the creation of a dedicated evolved packet core (EPC), and a dedicated bearer with a GBR bandwidth for voice traffic to/from the UE 100. In some examples, the PGW 116(1) is configured to send a create bearer request to a mobility management entity (MME) 118 configured to, among other things, perform signaling for establishing bearer channels dedicated to the communication session with the UE 100. Accordingly, such a create bearer request may cause the creation of the bearer traffic flow for the VoLTE call with the UE 100.

As noted above, however, in some situations, the dedicated bearer may fail for an active call. For example, corruption of data used by the PCRF 112(1) may cause a dedicated bearer failure. As another example, the sudden unavailability of a Diameter routing agent (DRA) may cause a dedicated bearer failure. These are merely examples, and other issues may arise that cause a dedicated bearer failure. At 120, the P-CSCF node 106 may determine that the dedicated bearer has failed. The P-CSCF node 106 may be configured to determine that the dedicated bearer has failed at 120 in various ways. In one example, the P-CSCF node 106 sends the request (e.g., the AAR 114) to the PCRF 112(1) and receives an error code from the PCRF 112(1) in response to sending the request (e.g., the AAR 114). This error code may indicate, to the P-CSCF node 106, that the dedicated bearer has failed. In another example, the P-CSCF node 106 may fail to receive a response from the PCRF 112(1) within a predetermined time period since sending the request (e.g., the AAR 114) to the PCRF 112(1). In other words, the request (e.g., the AAR 114) may timeout after a predetermined time period (e.g., a few seconds), and this timeout may indicate, to the P-CSCF node 106, that the dedicated bearer has failed. As yet another example, the P-CSCF node 106 may determine that a Diameter (Rx) link used to communicate with the PCRF 112(1) is broken or otherwise unavailable (e.g., not working properly). Thus, the P-CSCF node 106 may determine that a dedicated bearer has failed by (i) not receiving an expected response (e.g., an AAA) from the PCRF 112(1), or (ii) not being able to communicate with the PCRF 112(1) using the standard protocol, such as the Diameter protocol, as defined by the Internet Engineering Task Force (IETF).

In response to determining, at 120, that the dedicated bearer has failed, the P-CSCF node 106 may send a SIP message 122 (e.g., an error code) to the UE 100 that causes the UE 100 to refrain from sending SIP requests using the SIP INVITE method. That is, the UE 100, upon receiving the SIP message 122 (labeled "Hold INVITES 122" in FIG. 1) may refrain from sending any further SIP INVITES until the UE 100 receives further instructions. In some examples, refraining from sending any further SIP INVITES may include holding any pending SIP requests in a buffer or a queue until further instructions are received by the UE 100. In other examples, refraining from sending any further SIP INVITES may include refraining from generating SIP requests that use the SIP INVITE method. After sending the SIP message 122 to the UE 100, the P-CSCF node 106 may, at 124, identify a PGW 116 associated with an identifier (e.g., an IP address, etc.) of the UE 100. In the example of FIG. 1, the P-CSCF node 106 may determine that PGW 116(1) is associated with the identifier of the UE 100. For example, as shown in FIG. 1, the P-CSCF node 106 may access a PGW mapping table 126 to identify the PGW 116(1) as the PGW where the UE's 100 session resides. The PGW mapping table 126 may be a lookup table that associates UE identifiers (e.g., IP addresses) with assigned PGWs 116 for multiple sessions, including the session that is being setup for the UE 100 in FIG. 1. This PGW mapping table 126 may be stored locally at the P-CSCF node 106 (e.g., in local memory of the P-CSCF node 106), and/or at a remote storage location that is remote from (e.g., external to, geographically remote from, etc.) the P-CSCF node 106. The PGW mapping table 126 is a tool that the P-CSCF node 106 can use to determine where the session associated with the UE 100 resides, and, specifically, on which PGW 116 the session resides. The P-CSCF node 106 may determine the identifier (e.g., the IP address) of the UE 100 from a SIP request, such as the SIP request 110, sent by the UE 100. For example, the identifier (e.g., the IP address) of the UE 100 may be included in the contact header of the SIP request (e.g., the SIP request 110). By extracting the UE identifier (e.g., IP address) from the contact header of the SIP request (e.g., the SIP request 110), the P-CSCF node 106 can use the extracted UE identifier to look up, in the PGW mapping table 126, which PGW 116 is associated with the UE's 100 session. In some examples, the PGW mapping table 126 informs the P-CSCF node 106 as to a particular UE identifier that is in the subnet of a specific PGW 116, which, in this case, is the PGW 116(1) shown in FIG. 1.

Upon identifying the PGW 116(1) as the PGW associated with the session of the UE 100, the P-CSCF node 106 may send an instruction 128 to the identified PGW 116(1) to dissociate the dedicated bearer from the communication session associated with the UE 100. In some examples, the instruction 128 (labeled "delete bearer 128" in FIG. 1) is an instruction to delete the dedicated bearer for the subscriber associated with the UE 100. Notably, the instruction 128 may be sent from/by the P-CSCF node 106 directly to the identified PGW 116(1) (e.g., not via a PCRF 112), which is different from how the P-CSCF node 106 is configured to communicate in existing 4G networks. In today's 4G network topology, a P-CSCF node generally transmits messages via a PCRF, such as the PCRF 112(1). In the example of FIG. 1, the instruction 128 bypasses the PCRF 112(1) and is sent directly to the PGW 116(1). For example, the P-CSCF node 106 may be configured to send the instruction 128 to the PGW 116(1) using a representational state transfer (REST) application programming interface (API).

Once the instruction 128 is received at the PGW 116(1), the PGW 116(1) can delete the dedicated bearer at 130, which may cause the dedicated bearer to be dissociated from the communication session associated with the UE 100. In some examples, the deletion of the dedicated bearer at 130 includes "flushing out" the bearer using a flush command. Additionally, or alternatively, the PGW 116(1) may send a message 132 to the UE 100 to cause the UE 100 to perform a new attach procedure, which is how the communication session is recovered without a session failure (e.g., without a dropped VoLTE call, or a CS Fallback to a circuit-switched network, etc.). That is, because the UE 100 had previously been instructed to refrain from sending SIP INVITES until further instructions, and because the further instructions are received by the UE 100 in the message 132 (labeled "new attach 132" in FIG. 1), this permits the UE 100 to resume sending SIP INVITES for purposes of setting up the communication session. In some examples, the message 132 is sent to the mobile subscriber ISDN (MSISDN) associated with the UE 100. This message 132 may indicate, to the UE 100, that the dedicated bearer for the UE 100 has been deleted.

In response to receiving the message 132 from the PGW 116(1), the UE 100 may perform a new attach procedure, which may involve various procedures including, without limitation, the UE 100 sending a new attach request to the MME 118, and the MME 118 sending a create session request 136 to a new/different PGW 116(2), and the PGW 116(2) forwarding the request 136 to a new/different PCRF 112(2). Additional messaging 138 to complete the attachment (and the setup of the session) may be performed, such as the PCRF 112(2) sending a message back to the PGW 116(2) and to the MME 118 for completing the new registration for the UE 100. Furthermore, the additional messaging 138 may include the UE 100 sending, to the P-CSCF node 106 (or to a different P-CSCF node not shown in FIG. 1), another SIP request using the SIP REGISTER method, followed by the UE 100 sending, to the P-CSCF node 106 (or to the different P-CSCF node), another SIP request using the SIP INVITE method to recover the VoLTE call. It is to be appreciated that the attach and setup procedures performed at 138 to recover the VoLTE call can include, among other things, the establishment of a new dedicated bearer, as described herein. It is also to be appreciated that attach and setup procedures for a given communication session may vary by implementation, session type (e.g., phone call verses video conference, emergency verses non-emergency call, etc.), attachment result (e.g., combined attached verses not combined attached), network topology, and/or other factors. Accordingly, detailed and exhaustive examples of setup procedures and the order in which they are performed in order to complete an attachment and to setup a communication session are not described herein, as the various possible setup procedures are generally known to a person having ordinary skill in the art. As such, any given session setup may include some or all of the example setup procedures described herein, performed in any suitable order to establish a communication session, such as a VoLTE call. It is to be appreciated that a communication session is not successfully established unless and until the UE 100 receives a final SIP response in the form of a 2xx response. In any case, FIG. 1 illustrates a technique for recovering a VoLTE call from a dedicated bearer failure.

Figure 2:
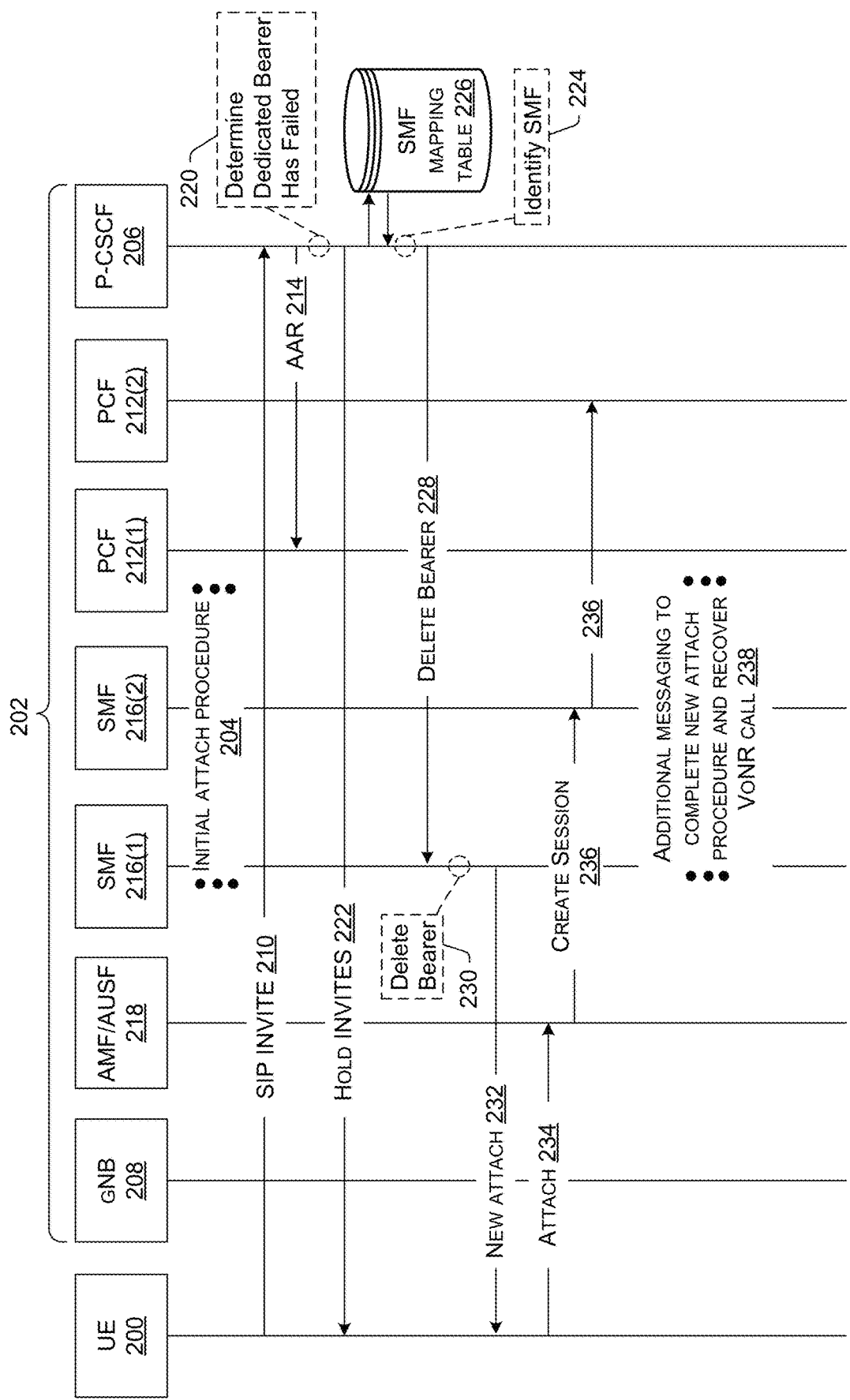
FIG. 2 is a diagram illustrating example signaling between a UE and example network nodes of a $5^{th}$ Generation (5G) New Radio (NR) network during setup of a Voice over New Radio (VoNR) call, as well as a technique for recovering the VoNR call from a dedicated bearer failure.

FIG. 2 is a diagram illustrating example signaling between a UE 200 and example network nodes 202 of a 5G NR network during setup of a VoNR call, and a technique for recovering the VoNR call from a dedicated bearer failure. The technique shown in FIG. 2 is similar to the technique shown in FIG. 1, except that 5G terminology is used, and 5G network nodes 202 are configured to carry out the session recovery procedure. It is to be appreciated that the "nodes" 202 depicted in FIG. 2 may in fact represent multiple nodes or a single node. It is also to be appreciated that additional nodes may be utilized in the setup of a communication session (e.g., a VoNR call) even though they are not depicted in FIG. 2, similar to the description above with respect to FIG. 1.

The UE 200 may be similar to the UE 100 described above with reference to FIG. 1. The UE 200 may also be a 5G-compliant UE 200 that is configured to request establishment of a communication session (e.g., a VoNR call in the example of FIG. 2). FIG. 2 illustrates that the UE 200 may perform an initial (first) attach procedure 204, which may be similar to the attach procedure 104 described above with respect to FIG. 1, except that the attachment may be to a 5G NR network. Once the UE 200 has completed the initial attach procedure 204, the UE 200 will have established a radio link in order to transmit data to, and receive data from, particular ones of the nodes 202 in the telecommunications network, including one or more nodes in the IMS core.

Before attempting to setup and establish a communication session, the UE 200 may perform the initial attach procedure 204, which may include, among other sub-procedures, requesting registration for one or more IMS-based services provided via the IMS core. Registration of the UE 200 can involve identifying a P-CSCF node 206 of the IMS core, and sending a registration request via a RAN (e.g., via a gNodeB 208 (abbreviated to "gNB" 208 in FIG. 2)) to an address of the P-CSCF node 206. To register for VoNR services, the registration request may include an packet data network (PDN) connectively request.

After the UE 200 has performed the initial attached procedure 204 and is attached to a telecommunications network, a user of the UE 200 can initiate a communication session, such as a VoNR call, such as by selecting an existing contact, by dialing a phone number on a keypad, by speaking an utterance (e.g., "Call Mom"), and so on. To initiate a VoNR call, the UE 200 may send a SIP request 210 using the SIP INVITE method. This SIP request 210 may be sent from the UE 200 (acting as a MO UE) to the IMS core, and in particular, to a P-CSCF node 206. Again, it is to be appreciated that, although many of the examples herein are described in the context of an originating UE 200 during the setup of a communication session, the techniques and systems described herein are not limited to session setup or to an originating UE for that matter, as the techniques and systems are also applicable to a terminating UE and/or to mid-session scenarios, such as adding a party in the middle of an ongoing session (e.g., a conference call), upgrading or downgrading a VoNR call during a session, resuming a call that has been placed on-hold, or the like. These alternate examples may nevertheless include sending the SIP request 210 (e.g., the SIP INVITE) from a UE 200 to the IMS core (e.g., to a P-CSCF node 206).

It is to be appreciated that the initial setup procedures can include various actions and message transmissions by and between the UE 200 and various network nodes 202 in addition to the example actions and message transmission described herein and shown in FIG. 2. In general, any suitable setup procedures known to a person having ordinary still in the art can be included in the initial setup procedures to establish a communication session for the UE 200 over a telecommunications network. Because network topologies vary between service providing entities, the signaling employed during attach procedures and setup procedures may vary. FIG. 2 illustrates an example setup procedure that involves the P-CSCF node 206 sending an AAR 214 (or a similar type of message) to a policy control function (PCF) 212(1). The AAR 214 may be sent in response to the P-CSCF node 206 receiving the SIP INVITE 210.

Similar to the description of the PCRF 112 with respect to FIG. 1, the PCF 212(1) is configured to answer the AAR 214 by transmitting an AAA (or a similar type of message) to the P-CSCF node 206, and to cause a dedicated bearer to be established for the communication session. For example, although not shown in FIG. 2, the PCF 212(1) is generally configured to interact with a session management function (SMF) 216(1), which may cause the installation of the charging rules created by the PCF 212(1), such as GBR bandwidth reserved for the VoNR call (e.g., in bps) for the RTP stream (both UL and DL directions), as well as a QCI value. It is to be appreciated that the SMF 216 depicted in FIG. 2 may be replaced by a user plane function (UPF), in some examples. A charging rules analysis may trigger the creation of a dedicated bearer with a GBR bandwidth for voice traffic to/from the UE 200. In some examples, the SMF 216(1) is configured to send a create bearer request to an access and mobility management function (AMF)/authentication server function (AUSF) 218 configured to, among other things, perform signaling for establishing bearer channels dedicated for the communication session with the UE 200. That is, the node 218 in FIG. 2 may be an AMF, an AUSF, or a combination thereof, and/or the network node 218 may represent two separate nodes including a AMF and an AUSF. The create bearer request may cause the creation of the bearer traffic flow for the VoNR call with the UE 200.

As noted above, in some situations, the dedicated bearer may fail for an active call. At 220, the P-CSCF node 206 may determine that the dedicated bearer has failed. The P-CSCF node 206 may be configured to determine that the dedicated bearer has failed in various ways. In one example, the P-CSCF node 206 sends a request (e.g., the AAR 214) to the PCF 212(1) and receives an error code from the PCF 212(1) in response to sending the request (e.g., the AAR 214). This error code may indicate, to the P-CSCF node 206, that the dedicated bearer has failed. In another example, the P-CSCF node 206 may fail to receive a response from the PCF 212(1) within a predetermined time period since sending the request (e.g., the AAR 214) to the PCF 212(1). In other words, the request (e.g., the AAR 214) may timeout after a predetermined time period (e.g., a few seconds), and this timeout may indicate, to the P-CSCF node 206, that the dedicated bearer has failed. As yet another example, the P-CSCF node 206 may determine that a Hypertext Transfer Protocol (HTTP) link used to communicate with the PCF 212(1) is broken or otherwise unavailable (e.g., not working properly). Thus, the P-CSCF node 206 may determine that a dedicated bearer has failed by (i) not receiving an expected response (e.g., an AAA) from the PCF 212(1), or by (ii) not being able to communicate with the PCF 212(1) using the standard protocol, such as the HTTP.

In response to determining, at 220, that the dedicated bearer has failed, the P-CSCF node 206 may send a SIP message 222 (e.g., an error code) to the UE 200 that causes the UE 200 to refrain from sending SIP requests using the SIP INVITE method. That is, the UE 200, upon receiving the SIP message 222 (labeled "Hold INVITES 222" in FIG. 2) may refrain from sending any further SIP INVITES until the UE 200 receives further instructions. After sending the SIP message 222 to the UE 200, the P-CSCF node 206 may, at 224, identify a SMF 216 associated with an identifier (e.g., an IP address) of the UE 200. In the example of FIG. 2, the P-CSCF node 206 may determine that SMF 216(1) is associated with the identifier of the UE 200. For example, as shown in FIG. 2, the P-CSCF node 206 may access a SMF mapping table 226 to identify the SMF 216(1) as the SMF where that session resides. The SMF mapping table 226 may be a lookup table that associates UE identifiers with assigned SMFs 116 for multiple sessions, including the session that is being setup for the UE 200 in FIG. 2. This SMF mapping table 226 may be stored locally at the P-CSCF node 206 (e.g., in local memory of the P-CSCF node 206), and/or at a remote storage location that is remote from (e.g., external to, geographically remote from, etc.) the P-CSCF node 206. The SMF mapping table 226 is a tool that the P-CSCF node 206 can use to determine where the session associated with the UE 200 resides, and, specifically, on which SMF 216 the session resides. The P-CSCF node 206 may determine the identifier (e.g., the IP address) of the UE 200 from a SIP request, such as the SIP request 210, sent by the UE 200. For example, an identifier (e.g., the IP address) of the UE 200 may be included in the contact header of the SIP request (e.g., the SIP request 210). By extracting the UE identifier (e.g., IP address) from the contact header of the SIP request (e.g., the SIP request 210), the P-CSCF node 206 can use the extracted UE identifier to look up, in the SMF mapping table 226, which SMF 216 is associated with the UE's 200 session. In some examples, the SMF mapping table 226 informs the P-CSCF node 206 as to a particular UE identifier that is in the subnet of a specific SMF 216, which, in this case, is the SMF 216(1) of FIG. 2.

Upon identifying the SMF 216(1) as being associated with the session of the UE 200, the P-CSCF node 206 may send an instruction 228 to the identified SMF 216(1) to dissociate the dedicated bearer from the communication session associated with the UE 200. In some examples, the instruction 228 (labeled "delete bearer 228" in FIG. 2) is an instruction to delete the dedicated bearer for the subscriber associated with the UE 200. Notably, the instruction 228 may be sent from/by the P-CSCF node 206 directly to the identified SMF 216(1) (e.g., not via a PCF 212). For example, the instruction 228 bypasses the PCF 212(1) and is sent directly to the SMF 216(1). In some examples, the P-CSCF node 206 is configured to send the instruction 228 to the SMF 216(1) using a REST API.

Once the instruction 228 is received at the SMF 216(1), the SMF 216(1) can delete the dedicated bearer at 230, which may cause the dedicated bearer to be dissociated from the communication session associated with the UE 200. In some examples, the deletion of the dedicated bearer at 230 includes "flushing out" the bearer using a flush command. Additionally, or alternatively, the SMF 216(1) may send a message 232 to the UE 200 to cause the UE 200 to perform a new attach procedure, which is how the communication session is recovered without session failure. That is, because the UE 200 had previously been instructed to refrain from sending SIP INVITES until further instruction, and because the further instructions are received by the UE 200 in the message 232 (labeled "new attach 232" in FIG. 2), the UE 200 is permitted to resume sending SIP INVITES for purposes of setting up the communication session. In some examples, the message 232 is sent to the MSISDN associated with the UE 200. This message 232 may indicate, to the UE 200, that the dedicated bearer for the UE 200 has been deleted.

In response to receiving the message 232 from the SMF 216(1), the UE 200 may perform a new attach procedure, which may involve various operations including, without limitation, the UE 200 sending a new attach request to the AMF/AUSF 218, and the AMF/AUSF 218 sending a create session request 236 to a new/different SMF 216(2), and the SMF 216(2) forwarding the request 236 to a new/different PCF 212(2). Additional messaging 238 to complete the attachment (and to setup the session) may be performed, such as the PCF 212(2) sending a message to the SMF 216(2) and to the AMF/AUSF 218 for completing the new registration for the UE 200. Furthermore, the additional messaging 238 may include the UE 200 sending, to the P-CSCF node 206 (or to a different P-CSCF node not shown in FIG. 2), another SIP request using the SIP REGISTER method, followed by the UE 200 sending, to the P-CSCF node 206 (or to the different P-CSCF node), another SIP request using the SIP INVITE method to recover the VoNR call. It is to be appreciated that the attach and setup procedures performed at 238 to recover the VoNR call can include, among other things, the establishment of a new dedicated bearer, as described herein. It is also to be appreciated that attach and setup procedures for a given communication session may vary by implementation, session type (e.g., phone call verses video conference, emergency verses non-emergency call, etc.), attachment result (e.g., combined attached verses not combined attached), network topology, and/or other factors. Accordingly, detailed and exhaustive examples of setup procedures and the order in which they are performed in order to complete an attachment and to setup a communication session are not described herein, as the various possible setup procedures are generally known to a person having ordinary skill in the art. As such, any given session setup may include some or all of the example setup procedures described herein, performed in any suitable order to establish a communication session, such as a VoNR call. It is to be appreciated that a communication session is not successfully established unless and until the UE 200 receives a final SIP response in the form of a 2xx response. In any case, FIG. 2 illustrates a technique for recovering a VoNR call from a dedicated bearer failure.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
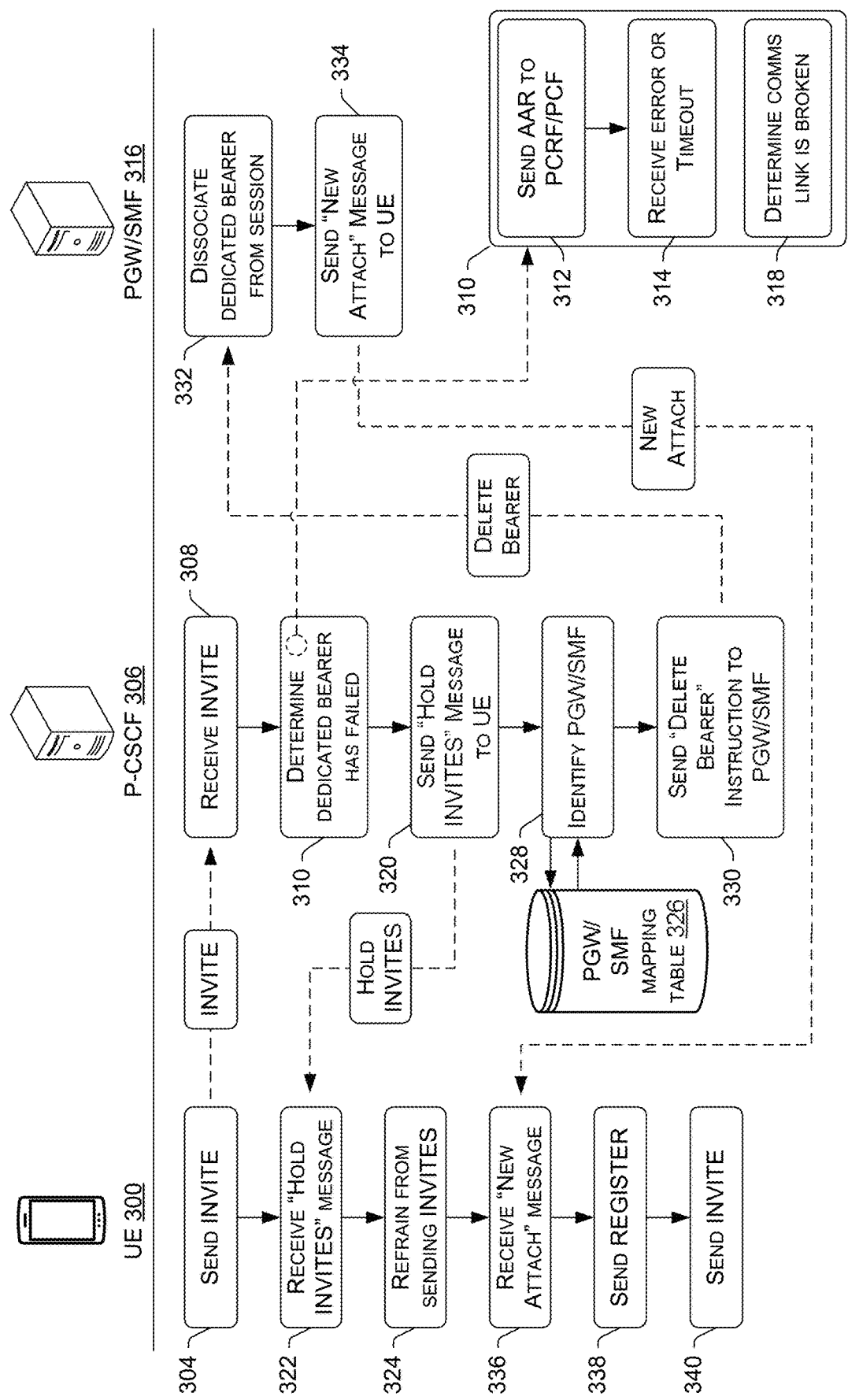
FIG. 3 illustrates a flowchart of an example process for recovering a communications session from a dedicated bearer failure, according to various embodiments.

FIG. 3 illustrates a flowchart of an example process 302 for recovering a communications session from a dedicated bearer failure, according to various embodiments. The process 302 is described with reference to the previous figures.

At 304, a UE 300 may send a SIP request 110/210 using the SIP INVITE method to a P-CSCF node 306. The UE 300 in FIG. 3 may be represent the UE 100 or the UE 200 described above with reference to FIGS. 1 and 2, respectively. The P-CSCF node 306 may represent the P-CSCF node 106 or the P-CSCF node 206 described above with reference to FIGS. 1 and 2, respectively. The SIP request 110/210 sent at 304 may be sent from the UE 300 (acting as a MO UE) to the IMS core, and in particular, to the P-CSCF node 306 to setup a communication session. The communication session may be a call, such as a VoLTE call or a VoNR call.

At 308, the P-CSCF node 306 may receive the SIP request 110/210 using the SIP INVITE method from the UE 300. At 310, the P-CSCF node 306 may determine that a dedicated bearer associated with the communication session has failed. The determination at 310 may be made during setup of the communication session, as described herein. Furthermore, as shown in FIG. 3, and as described elsewhere herein, the P-CSCF node 306 can make the determination at 310 in various ways by attempting to communicate with network node 102/202 including one of a PCRF 112(1) (for 4G) or a PCF 212(1) (for 5G). Example ways of determining a dedicated bearer failure are described with references to sub-blocks 312, 314, and 318.

At 312, the P-CSCF node 306 may send a request to the network node 102/202 (e.g., the PCRF 112(1) or the PCF 212(1)). In some examples, the request sent at 312 is an AAR 114/214.

At 314, in response to sending the request (e.g., the AAR 114/214) at 312, the P-CSCF node 306 may (i) receive an error code from the network node 102/202 (e.g., the PCRF 112(1) or the PCF 212(1)), or (ii) fail to receive a response from the network node 102/202 (e.g., the PCRF 112(1) or the PCF 212(1)) within a predetermined time period since the sending of the request at 312. That is, if, instead of receiving an expected AAA from the network node 102/202

(e.g., the PCRF 112(1) or the PCF 212(1)), the P-CSCF node 306 receives an error code or the request times out, the P-CSCF node 306 can deduce or determine that the dedicated bearer associated with the communication session has failed.

Alternatively, at 318, the P-CSCF node 306 may determine that a communication (comms) link used to communicate with the network node 102/202 (e.g., the PCRF 112(1) or the PCF 212(1)) is broken or otherwise unavailable. For example, the P-CSCF node 306 may attempt to send a request (e.g., an AAR 114/214), but may not be able to send the request because a communication link (e.g., a Diameter (Rx) link (for 4G) or a HTTP link (for 5G)) to the network node 102/202 (e.g., the PCRF 112(1) or the PCF 212(1)) is not functioning as it should. The P-CSCF node 306 can deduce or determine that the dedicated bearer associated with the communication session has failed based on the broken (or non-functioning) communication link.

At 320, in response to determining that the dedicated bearer has failed, the P-CSCF node 306 may send a SIP message 122/222 to the UE 300 associated with the communication session. This SIP message 122/222, upon receipt at the UE 300, may cause the UE 300 to refrain from sending SIP requests using a SIP INVITE method.

At 322, the UE 300 may receive the SIP message 122/222 (e.g., a SIP response) from the P-CSCF node 306. At 324, in response to receiving the SIP message 122/222 (e.g., SIP response), the UE 300 may refrain from sending SIP requests using the SIP INVITE method. That is, the UE 300 may place a "hold" on sending any future SIP INVITES until the UE 300 receives further instructions permitting the UE 300 to resume sending SIP INVITES.

At 328, after having sent the SIP message 122/222 to the UE 300, the P-CSCF node 306 may identify a network node 316 associated with an identifier of the UE 300, wherein the network node 316 includes one of a PGW 116(1) (for 4G) or a SMF 216(1) (for 5G). As shown in FIG. 3, and as described elsewhere herein, the P-CSCF node 306 may use a lookup table 326 to determine that the network node 316 (e.g., the PGW 116(1) or the SMF 216(1)) is associated with an identifier (e.g., an IP address) of the UE 300. The lookup table 326 may represent the PGW mapping table 126 or the SMF mapping table 226 described above with reference to FIGS. 1 and 2, respectively.

At 330, the P-CSCF node 306 may send an instruction 128/228 to the identified network node 316 (e.g., the PGW 116(1) or the SMF 216(1)) to dissociate the dedicated bearer from the communication session (e.g., to delete the dedicated bearer). In some examples, the instruction 128/228 is sent by the P-CSCF node 306 to the identified network node 316 (e.g., the PGW 116(1) or the SMF 216(1)) using a REST API.

At 332, the network node 316 (e.g., the PGW 116(1) or the SMF 216(1)) may dissociate the dedicated bearer from the communication session. At 334, the network node 316 (e.g., the PGW 116(1) or the SMF 216(1)) may send a message 132/232 to the UE 300 to cause the UE 300 to perform a new attach procedure to recover the communication session.

At 336, the UE 300 may receive the message 132/232 to perform a new attach procedure to recover the communication session. In response to receiving the message 132/232, the UE 300 may perform various actions to recover the communication session. Example actions to recover the session are shown in FIG. 3 at blocks 338 and 340.

At 338, the UE 300 may send a SIP request using a SIP REGISTER method as part of a new attach procedure. The SIP REGISTER may be sent to the P-CSCF node 306 involved in the session recovery process, or to a different P-CSCF node. At 340, the UE 300 may send a SIP request using the SIP INVITE method to recover the communication session. The SIP INVITE may be sent to the same P-CSCF node that received the SIP REGISTER, which may be the P-SCCF node 306 or a different P-CSCF node. Ultimately, after sending the SIP INVITE at 340, assuming no other issues arise to inhibit the establishment of the communication session, the communication session is recovered without session failure. For example, the recovered communication session may be established as a VoLTE call or as a VoNR call instead of the session "falling back" to a legacy 2G/3G network, or the session failing entirely (e.g., the call dropping).

Figure 4:
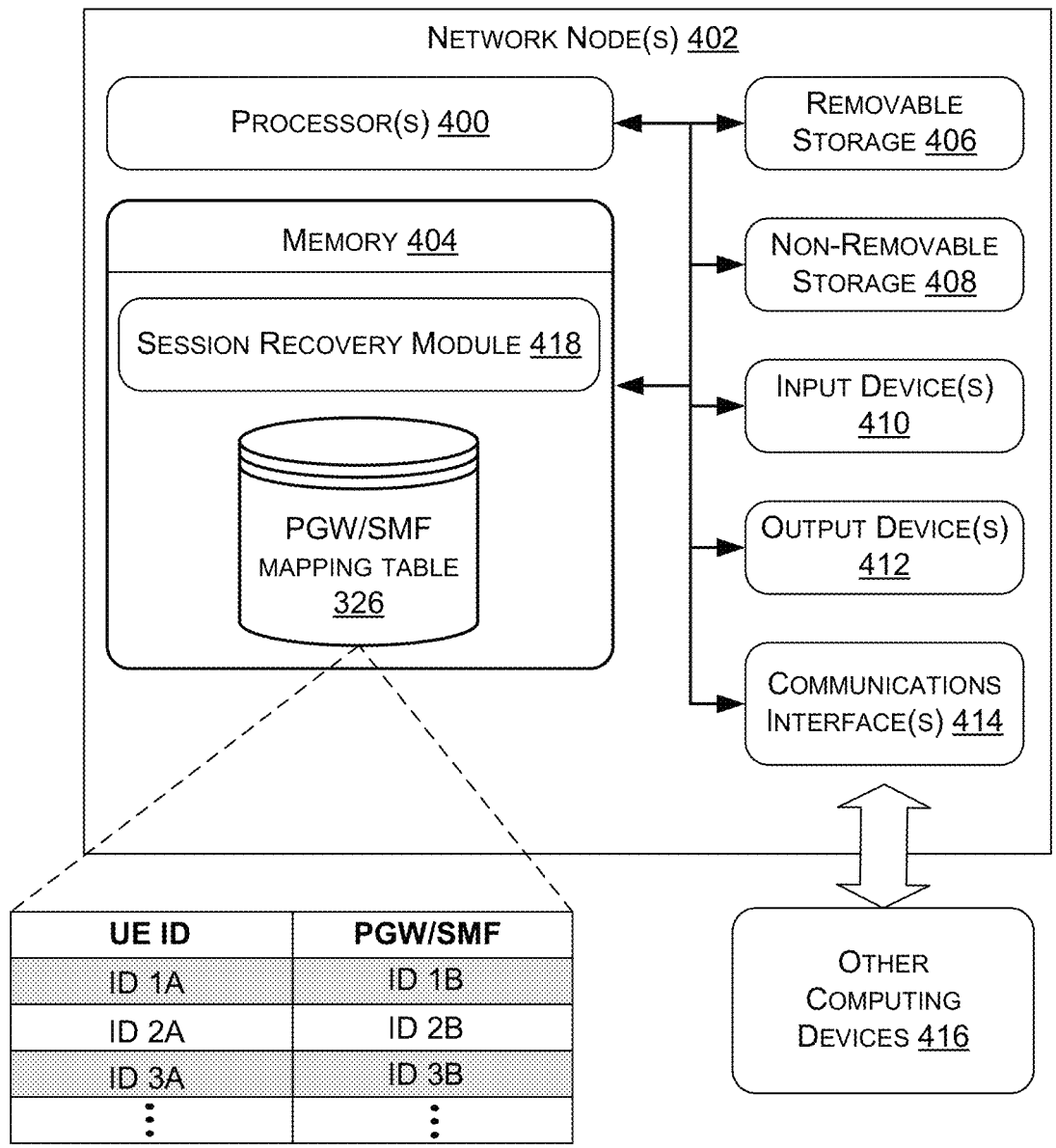
FIG. 4 is a block diagram of an example network node(s) with logic to implement a session recovery process, according to various embodiments.

FIG. 4 is a block diagram of an example network node(s) 402 with logic to implement a session recovery process, according to various embodiments. The network node(s) 402 may be representative of the P-CSCF nodes 106/206/306 described herein, and/or another network node(s) 316 (e.g., the PGW 116 or the SMF 216) described herein.

As shown, the network node(s) 402 may include one or more processors 400 and one or more forms of computer-readable memory 404. The network node(s) 402 may also include additional storage devices. Such additional storage may include removable storage 406 and/or non-removable storage 408.

The network node(s) 402 may further include input devices 410 (e.g., a touch screen, keypad, keyboard, mouse, pointer, microphone, etc.) and output devices 412 (e.g., a display, printer, speaker, etc.) communicatively coupled to the processor(s) 400 and the computer-readable memory 404. The network node(s) 402 may further include communications interface(s) 414 that allow the network node(s) 402 to communicate with other computing devices 416 (e.g., other network nodes, UEs, etc.) such as via a network. The communications interface(s) 414 may facilitate transmitting and receiving wired and/or wireless signals over any suitable communications/data technology, standard, or protocol, as described herein. For example, the communications interface(s) 414 can comprise a wired interface and/or one or more of a cellular radio, a wireless (e.g., IEEE 802.1x-based) interface, a Bluetooth® interface, and so on.

In various embodiments, the computer-readable memory 404 comprises non-transitory computer-readable memory 404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 404 may also be described as computer storage media and may include volatile and nonvolatile, removable and non-removable media implemented in any method or technology for storage of information, such as computer readable instructions, data structures, program modules, or other data. Computer-readable memory 404, removable storage 406 and non-removable storage 408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the network node(s) 402. Any such computer-readable storage media may be part of the network node(s) 402.

The memory 404 can include a session recovery module 418 (i.e., computer-executable instructions (or logic) that, when executed, by the processor(s) 400, perform the various acts and/or processes disclosed herein. For example, the session recover module 418 is configured to carry out session recovery process, as described herein. The session recovery process may include, for example, operations performed at one or more of blocks 308, 310, 320, 328, and 330, and/or operations performed at one or more of blocks 332 and 334 of the process 302 shown in FIG. 3.

The memory 404 can further be used to store a lookup table 326, which may represent the PGW mapping table 126 and/or the SMF mapping table 226 described herein. The table 326 may specify associations between UE identifiers and at least one of assigned PGWs 116 or assigned SMFs 216.

Figure 5:
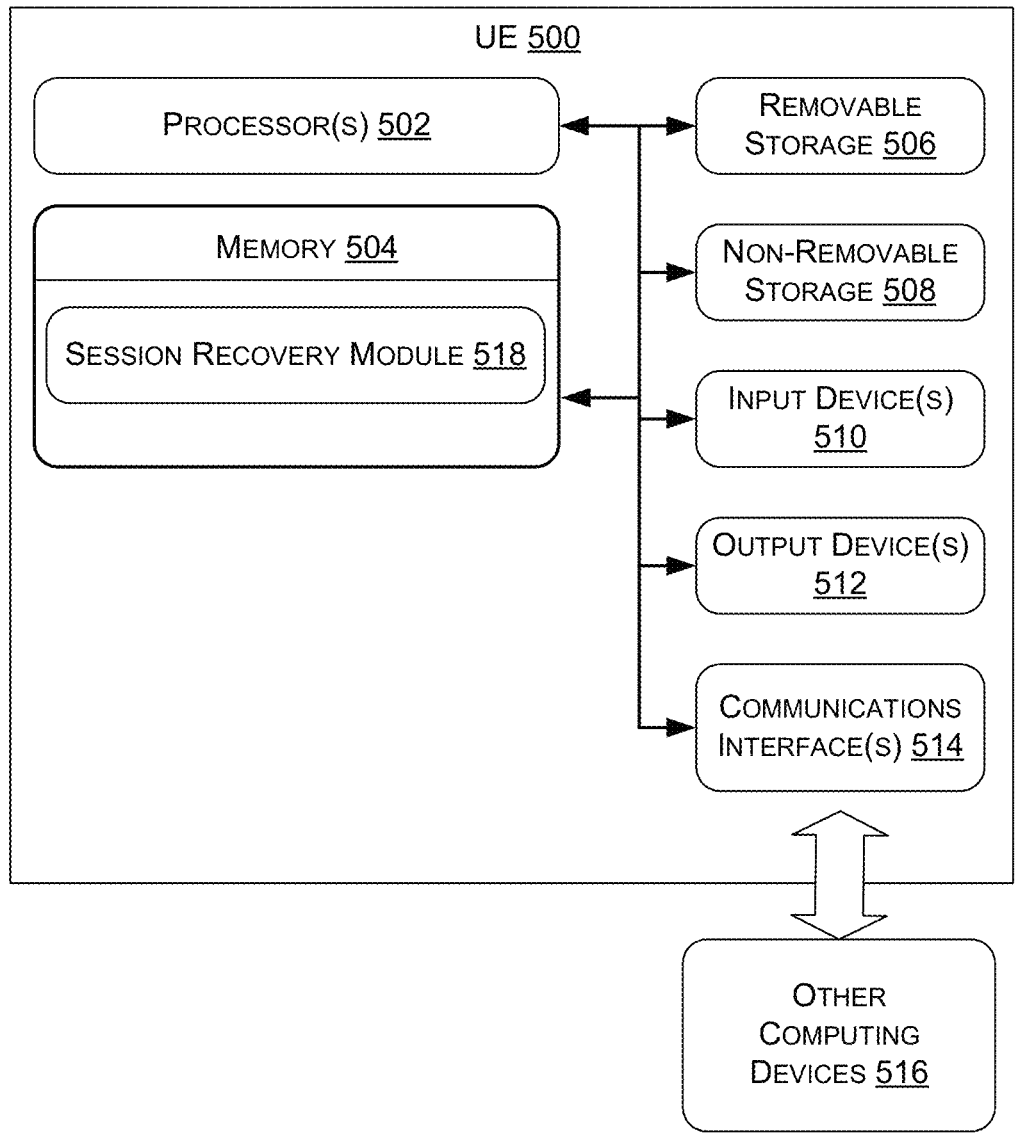
FIG. 5 is a block diagram of an example UE with logic to implement a session recovery process, according to various embodiments.

FIG. 5 is a block diagram of an example UE 500 with logic to implement a session recovery process, according to various embodiments. The UE 500 may be representative of the UEs 100/200/300 described herein.

As shown, the UE 500 may include one or more processors 502 and one or more forms of computer-readable memory 504. The UE 500 may also include additional storage devices. Such additional storage may include removable storage 506 and/or non-removable storage 508.

The UE 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The UE 500 may further include communications interface(s) 514 that allow the UE 500 to communicate with other computing devices 516 (e.g., network nodes, other UEs, etc.) such as via a network. The communications interface(s) 514 may facilitate transmitting and receiving wired and/or wireless signals over any suitable communications/data technology, standard, or protocol, as described herein. For example, the communications interface(s) 514 can comprise a wired interface and/or one or more of a cellular radio, a wireless (e.g., IEEE 802.1x-based) interface, a Bluetooth® interface, and so on. In some embodiments, the communications interface(s) 514 may include radio frequency (RF) circuitry that allows the UE 500 to transition between different RATs, such as transitioning between communication with a 5G NR RAT, a 4G LTE RAT and other legacy RATs (e.g., 3G/2G). The communications interface(s) 514 may further enable the UE 500 to communicate over circuit-switch domains and/or packet-switch domains.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 500. Any such computer-readable storage media may be part of the UE 500.

The memory 504 can include a session recovery module 518 (i.e., computer-executable instructions (or logic) that, when executed, by the processor(s) 502, perform the various acts and/or processes disclosed herein. For example, the session recover module 518 is configured to carry out session recovery process, as described herein. The session recovery process may include, for example, operations performed at one or more of blocks 304, 322, 324, 336, 338, and 340 of the process 302 shown in FIG. 3.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A system comprising:
    a proxy call session control function (P-CSCF) node;
    a first network node, and
    a second network node,
    wherein the P-CSCF node is configured to:
        determine that a dedicated bearer associated with a communication session has failed by:
            sending a request to the second network node; and
            at least one of:
                receiving an error code from the second network node; or
                failing to receive a response from the second network node within a predetermined time period since the sending of the request to the second network node;
        send a Session Initiation Protocol (SIP) message to a user equipment (UE) associated with the communication session, the SIP message causing the UE to refrain from sending SIP requests using a SIP INVITE method; and
send an instruction to the first network node to dissociate the dedicated bearer from the communication session.

2. The system of claim 1, wherein the first network node comprises one of a packet data network gateway (PGW) or a session management function (SMF).

3. The system of claim 1, wherein the request sent to the second network node comprises an authorization authentication request (AAR).

4. The system of claim 1, further comprising a second network node comprising one of a policy and charging rules function (PCRF) or a policy control function (PCF), wherein the P-CSCF node is configured to determine that the dedicated bearer associated with the communication session has failed by determining that a communication link used to communicate with the second network node is broken.

5. The system of claim 1, wherein the P-CSCF node is configured to determine that the first network node is associated with an identifier of the UE using a lookup table that associates UE identifiers with at least one of assigned PGWs or assigned SMFs.

6. The system of claim 1, wherein the P-CSCF node is configured to send the instruction to the first network node using a representational state transfer (REST) application programming interface (API).

7. The system of claim 1, wherein the P-CSCF node is configured to determine that the dedicated bearer associated with the communication session has failed during setup of the communication session.

8. A method comprising:
determining, by a proxy call session control function (P-CSCF) node, that a dedicated bearer associated with a communication session has failed by:
sending a request to a first network node; and
at least one of:
receiving an error code from the first network node; or
failing to receive a response from the first network node within a predetermined time period since the sending of the request to the first network node;
sending, by the P-CSCF node, a Session Initiation Protocol (SIP) message to a user equipment (UE) associated with the communication session, the SIP message causing the UE to refrain from sending SIP requests using a SIP INVITE method; and
sending, by the P-CSCF node, an instruction to a second network node to dissociate the dedicated bearer from the communication session.

9. The method of claim 8, further comprising identifying, by the P-CSCF node, the second network node associated with an identifier of the UE, the second network node comprising one of a packet data network gateway (PGW) or a session management function (SMF).

10. The method of claim 8, wherein the request sent to the first network node comprises an authorization authentication request (AAR).

11. The method of claim 8, wherein the determining, by the P-CSCF node, that the dedicated bearer associated with the communication session has failed comprises:
determining, by the P-CSCF node, that a communication link used to communicate with the first network node is unavailable, the first network node comprising one of a policy and charging rules function (PCRF) or a policy control function (PCF).

12. The method of claim 8, further comprising identifying the second network node using a lookup table that associates UE identifiers with at least one of assigned PGWs or assigned SMFs.

13. The method of claim 8, wherein the instruction is sent by the P-CSCF node to the second network node using a representational state transfer (REST) application programming interface (API).

14. The method of claim 8, wherein the sending, by the P-CSCF node, the instruction to the second network node to dissociate the dedicated bearer from the communication session causes the second network node to send a message to the UE to cause the UE to perform a new attach procedure to recover the communication session.

15. The method of claim 8, wherein the P-CSCF node determines that the dedicated bearer associated with the communication session has failed during setup of the communication session.

16. The method of claim 8, further comprising, prior to the determining, by the P-CSCF node, that the dedicated bearer associated with the communication session has failed, receiving, by the P-CSCF node, and from the UE, a SIP request using the SIP INVITE method.

17. The method of claim 8, wherein the communication session comprises one of a Voice over Long Term Evolution (VoLTE) call or a Voice over New Radio (VoNR) call.

18. A proxy call session control function (P-CSCF) node comprising:
at least one processor; and
a memory storing instructions that cause the at least one processor to perform operations comprising:
determine that a dedicated bearer associated with a communication session has failed by:
sending a request to a first network node; and
at least one of:
receiving an error code from the first network node; or
failing to receive a response from the first network node within a predetermined time period since the sending of the request to the first network node;
sending, by the P-CSCF node, a Session Initiation Protocol (SIP) message to a user equipment (UE) associated with the communication session, the SIP message causing the UE to refrain from sending SIP requests using a SIP INVITE method; and
sending, by the P-CSCF node, an instruction to a second network node to dissociate the dedicated bearer from the communication session.

19. The P-CSCF node of claim 18, wherein the P-CSCF node determines that the dedicated bearer associated with the communication session has failed during setup of the communication session.

20. The P-CSCF node of claim 18, further comprising, prior to the determining, by the P-CSCF node, that the dedicated bearer associated with the communication session has failed, receiving, by the P-CSCF node, and from the UE, a SIP request using the SIP INVITE method.

* * * * *